(12) United States Patent
Suzuta et al.

(10) Patent No.: US 10,174,876 B2
(45) Date of Patent: Jan. 8, 2019

(54) PIPE STRUCTURE, AIRCRAFT, AND METHOD FOR GIVING ROBUSTNESS TO LEAK DETECTION

(71) Applicant: MITSUBISHI AIRCRAFT CORPORATION, Aichi (JP)

(72) Inventors: Tadahiko Suzuta, Tokyo (JP); Hiroyuki Yamamoto, Tokyo (JP); Kei Takao, Aichi (JP); Ichiro Maeda, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 227 days.

(21) Appl. No.: 15/004,545

(22) Filed: Jan. 22, 2016

(65) Prior Publication Data

US 2016/0238181 A1 Aug. 18, 2016

(30) Foreign Application Priority Data

Feb. 18, 2015 (JP) ................................. 2015-029569

(51) Int. Cl.
*F16L 55/16* (2006.01)
*F16L 55/168* (2006.01)
(Continued)

(52) U.S. Cl.
CPC ............ *F16L 55/168* (2013.01); *F16L 23/04* (2013.01); *F16L 55/07* (2013.01); *F17D 5/06* (2013.01);
(Continued)

(58) Field of Classification Search
CPC ......... F16L 55/168; F16L 23/04; F16L 55/07; G01M 3/002; G01M 3/18; G01M 3/22
See application file for complete search history.

(56) References Cited

U.S. PATENT DOCUMENTS 4,750,189 A * 6/1988 Lancaster ................ F17D 5/04
374/4
8,826,942 B2 * 9/2014 Millet .................... B64D 13/00
138/104
(Continued)

FOREIGN PATENT DOCUMENTS

CN 103775831 A 5/2014
JP S51-000955 Y 1/1976
(Continued)

OTHER PUBLICATIONS

Office action for Japanese Application No. 2015-029569 dated Oct. 23, 2018.

*Primary Examiner* — Hezron E Williams
*Assistant Examiner* — David Z Huang
(74) *Attorney, Agent, or Firm* — Pearne & Gordon LLP

(57) ABSTRACT

The present invention provides a pipe structure including a pipe that is disposed along an approximately horizontal direction, and has a plurality of ducts through which a gaseous body having a higher temperature than a temperature of a surrounding atmosphere continuously flows, and a plurality of couplings each connecting the ducts together; and a cover covering an outer periphery of the pipe. The cover defines a plurality of vents from which the gaseous body leaking from the pipe flows out of the cover at an interval in a length direction of the pipe. As the plurality of vents, the cover includes at least first vents located corresponding to the couplings. Respective positions of the first vents are substantially set within a range from a two o'clock position to a ten o'clock position through a six o'clock position in a cross sectional surface of the cover.

14 Claims, 12 Drawing Sheets

(51) Int. Cl.
   *F17D 5/06* (2006.01)
   *G01M 3/00* (2006.01)
   *G01M 3/18* (2006.01)
   *G01M 3/22* (2006.01)
   *F16L 23/04* (2006.01)
   *F16L 55/07* (2006.01)

(52) U.S. Cl.
   CPC .............. *G01M 3/002* (2013.01); *G01M 3/18* (2013.01); *G01M 3/22* (2013.01); *F16L 2201/30* (2013.01)

(56) References Cited

U.S. PATENT DOCUMENTS

| | | | |
|---|---|---|---|
| 2009/0223284 A1 | 9/2009 | Buhring | |
| 2012/0018014 A1* | 1/2012 | Fernandes | F16L 23/006 137/561 A |
| 2014/0130894 A1 | 5/2014 | Fukuda | |

FOREIGN PATENT DOCUMENTS

| | | |
|---|---|---|
| JP | 2009-511884 A | 3/2009 |
| JP | 2014-94663 A | 5/2014 |

* cited by examiner

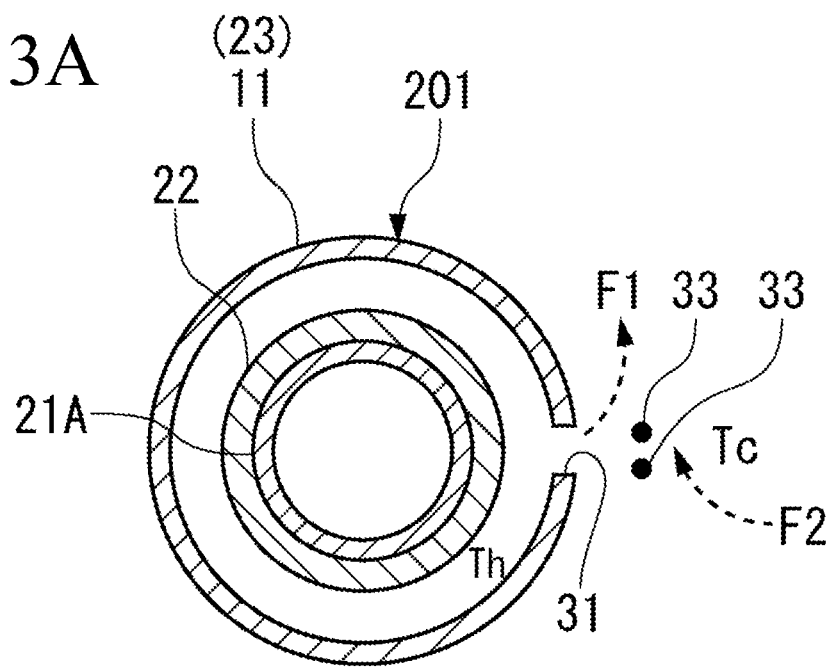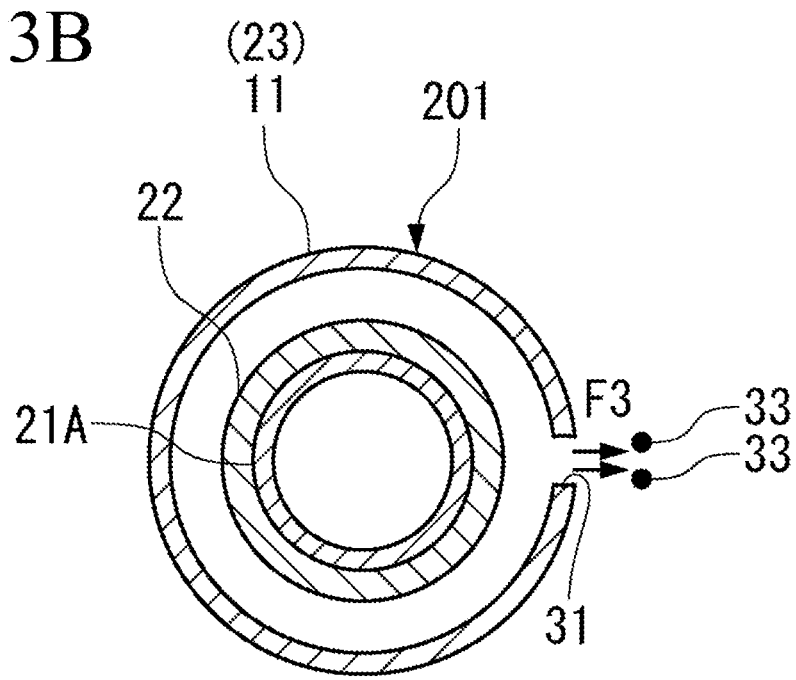

FIG. 12A
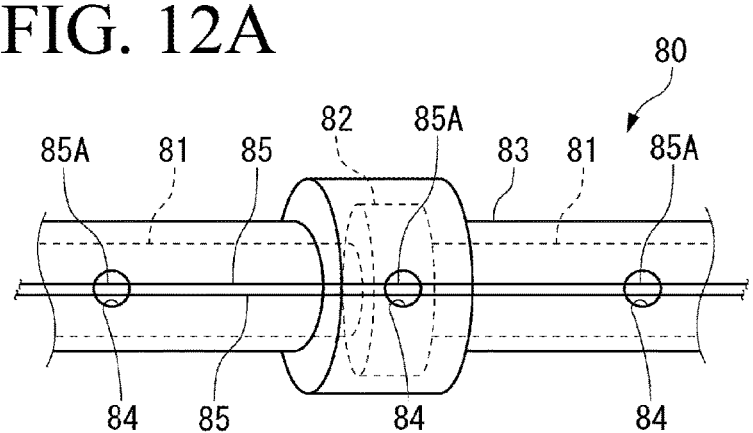
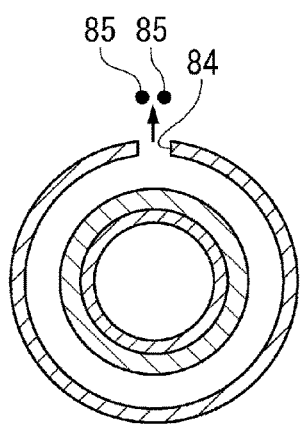
FIG. 12B
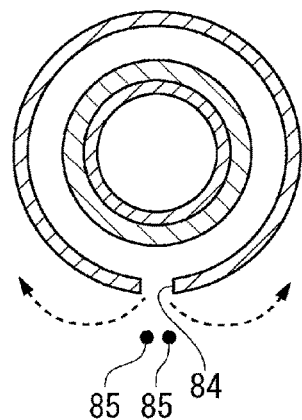
FIG. 12C

PIPE STRUCTURE, AIRCRAFT, AND METHOD FOR GIVING ROBUSTNESS TO LEAK DETECTION

BACKGROUND OF THE INVENTION

Field of the Invention

The present invention relates to a method for giving robustness to detection of a leak deviating from a tolerable amount when a certain amount of leak from a duct is tolerated, a pipe structure capable of achieving the method, and an aircraft including the pipe structure.

Description of the Related Art

An airframe of an aircraft is provided with a pipe through which high-temperature bleed air from an engine flows (for example, Japanese Patent Laid-Open No. 2014-094663).

As shown in FIG. 12A, a bleed air pipe 80 includes a plurality of ducts 81 and a coupling 82 that connects the ducts 81 together. The coupling 82 clamps flanges (not shown) of the ducts 81 that are abutted against each other.

In the typical bleed air pipe 80 of the aircraft, a sealing material such as a gasket is not provided between the flanges or between the coupling 82 and the flanges in view of a weight reduction and maintainability. A leak of a small amount of bleed air from between the flanges to the outside is tolerated.

While a small amount of leak is tolerated, it is necessary to detect a leak when the coupling 82 is loosened or damaged, and a leak amount from a connection portion of the ducts 81 is increased. Of course, it is also necessary to detect a leak when cracks, corrosion, or the like are generated in the duct 81, and a leak from a body portion of the duct 81 occurs.

When a certain amount of leak is tolerated depending on a portion of the pipe, it is desirable to detect only a leak deviating from the tolerable amount due to damage or the like in the coupling and the ducts without detecting a leak with the tolerable amount.

In order to detect a leak of the high-temperature bleed air from the pipe, a plurality of vent holes 84 are formed in a cover 83 that covers the ducts 81 and the coupling 82 as shown in FIG. 12A. A line-shaped sensor 85, a temperature of which is increased by the bleed air flowing out from the vent holes 84, is provided. The leak can be detected based on electrical resistance of the sensor 85 that is changed when the temperature is increased.

Here, a temperature of each portion 85A of the sensor 85 that is increased by the bleed air flowing out from the vent hole 84 largely varies due to various factors such as a distance from the vent hole 84 to the portion 85A, movement of a surrounding gaseous body, and fluctuations in temperature/pressure of the gaseous body.

The temperature variation in each portion 85A of the sensor 85 with respect to a flow rate of the bleed air flowing out from the vent hole 84 (referred to as a leak flow rate below) is large in some cases. In this case, it is very difficult to determine an appropriate set temperature at the time of setting a temperature corresponding to a suitable leak flow rate in the leak sensor, and detecting the leak when a temperature equal to or more than the set temperature is sensed by the sensor 85. Depending on the set temperature, a tolerable small amount of leak may be frequently detected, or a surrounding environment of the pipe may have a high temperature due to no detection of a leak deviating from a tolerable leak amount.

In order to avoid the above problems, it is important to provide robustness for the leak detection.

Accordingly, an object of the present invention is to provide a method for giving robustness to leak detection, a pipe structure capable of achieving the method, and an aircraft including the pipe structure.

SUMMARY OF THE INVENTION

Positions of a plurality of leak-detecting vent holes formed in a cover of a pipe are dispersed in a circumferential direction of the cover, and are not unified.

The inventors of the present invention focused attention on a fact that a leak with a small flow rate is detected in some cases and not detected in other cases depending on a circumferential position of the vent hole.

For example, when the vent hole 84 is positioned on an upper side as shown in FIG. 12B, a leak flow flowing out to the upper side along a hole axis direction from the vent hole 84 directly reaches the sensor 85 as indicated by a solid arrow even when the leak flow has a small flow rate. The temperature of the sensor 85 is increased by the high-temperature leak flow reaching the sensor 85, so that a leak is detected.

On the other hand, when the vent hole 84 is positioned on a lower side as shown in FIG. 12C, the leak flow is lifted up with respect to a surrounding gaseous body as indicated by a dashed arrow by buoyancy in a case in which the leak flow has a small flow rate. Therefore, the high-temperature gaseous body does not reach the sensor 85, and no leak is detected.

A pipe structure of the present invention based on the above finding includes: a pipe that is disposed along an approximately horizontal direction, and has a plurality of ducts through which a gaseous body having a higher temperature than a temperature of a surrounding atmosphere continuously flows, and a plurality of couplings each connecting the ducts together; and a cover that covers an outer periphery of the pipe. The cover defines a plurality of vents from which the gaseous body leaking from the pipe flows out of the cover at an interval in a length direction of the pipe. As the plurality of vents, the cover includes at least first vents that are located corresponding to the plurality of couplings.

In the present invention, respective positions of the first vents are substantially set within a range from a two o'clock position to a ten o'clock position through a six o'clock position in a cross sectional surface of the cover. The pipe structure of the present invention may include a leak sensor that detects a leak of the gaseous body. The leak sensor may be configured to have a sensitive section that passes a position corresponding to each of the plurality of vents and is sensitive to a temperature or a concentration of a gaseous body outside the cover, and a detection section that detects the leak by using a state of the sensitive section.

In the pipe structure of the present invention, each of the first vents exists in a connection portion, and each of second vents exists in a general portion. Preferably, respective positions of the second vents that are the vents other than the first vents are substantially set to a twelve o'clock position or its vicinity in the cross sectional surface of the cover.

In the pipe structure of the present invention, the leak sensor is preferably disposed so as to be erected up along a circumferential direction of the cover at positions corresponding to the plurality of second vents that are the vents other than the first vent.

Preferably, the pipe structure of the present invention further includes a roof that is configured to restrict a rise of a gaseous body in a vicinity of at least one of the first vents, wherein the roof may be disposed above the at least one first vent at an interval from the cover that defines the first vents, and the sensitive section may be disposed below the roof.

The roof may be supported on the cover by a support portion that links the roof and the cover, or on the sensitive section by a clip that holds the sensitive section.

The pipe structure of the present invention preferably includes a wind protection wall that is configured to block a flow of a gaseous body outside the cover that affects a flow of the gaseous body flowing out from the first vents or the second vents in a vicinity of at least one of the first vents or in a vicinity of at least one of the second vents.

An aircraft of the present invention includes at least one of the above pipe structures.

The present invention can be applied to a pipe structure through which bleed air from an engine or an auxiliary power unit that is a power source of the aircraft flows.

A method for giving robustness to leak detection of the present invention includes: defining a plurality of vents in a cover that covers an outer periphery of a pipe disposed along an approximately horizontal direction at an interval in a length direction of the pipe; causing a gaseous body leaking from the pipe and having a higher temperature than a temperature of an atmosphere around the pipe to flow out of the cover from the vents; and detecting a leak of the gaseous body by using a temperature or a concentration of the gaseous body at positions corresponding to the vents, wherein respective positions of at least first vents located corresponding to a plurality of couplings constituting the pipe out of the plurality of vents are substantially set within a range from a two o'clock position to a ten o'clock position through a six o'clock position in a cross sectional surface of the cover.

In accordance with the present invention, the positions of the leak-detecting first vents that are formed in the cover covering the pipe disposed in the approximately horizontal direction are positioned in a lower portion and the above range close to the lower portion in the cross sectional surface of the cover. Thus, when the gaseous body leaking from the pipe and flowing out from the first vents has a small flow rate, a flow of the gaseous body rises by deviating from the sensitive section of the leak sensor by buoyancy. When the positions of the first vents are substantially unified within the above range, the robustness is given to the leak detection by controlling the flow by the buoyancy. It is thus possible to ensure reliability of the pipe structure while avoiding erroneous detection of the leak.

Also, the roof may be provided in the vicinity of the first vents. In this case, when the flow flowing out from the first vents is increased more than a tolerable leak amount, the flow is concentrated around the sensitive section of the leak sensor below the roof, so that the sensitive section reacts rapidly. Consequently, the robustness can be improved.

BRIEF DESCRIPTION OF THE DRAWINGS

FIGS. 3A and 3B are arrow views (cross-sectional views) taken along a line III-III in FIG. 2A;

FIG. 12A is a view for explaining a background art and a problem to be solved by the present invention, and FIGS. 12B and 12C are views for explaining finding obtained as a premise of the present invention.

DETAILED DESCRIPTION OF THE PREFERRED EMBODIMENTS

In the following, embodiments of the present invention will be described by reference to the accompanying drawings.

[First Embodiment]

Figure 1:
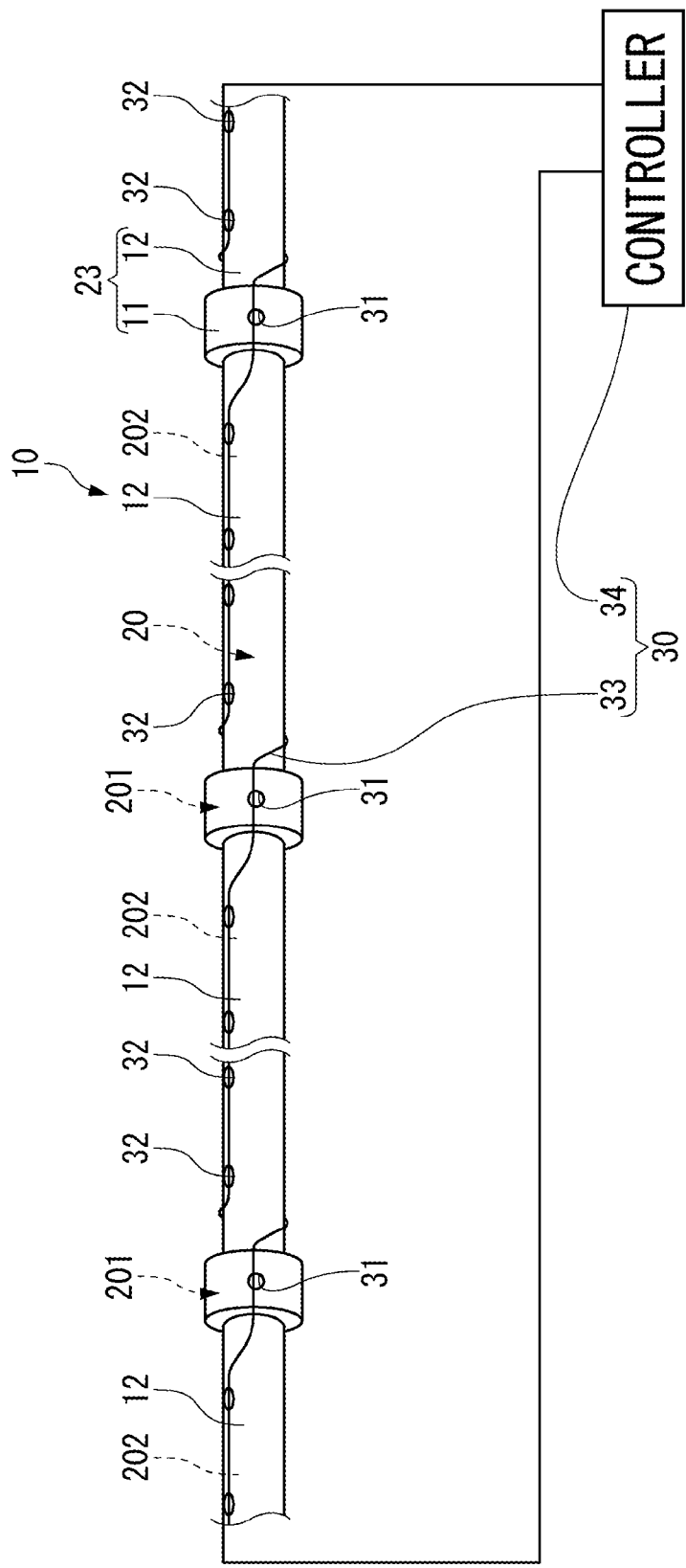
FIG. 1 is a view illustrating a pipe structure according to a first embodiment.
Figure 2A:
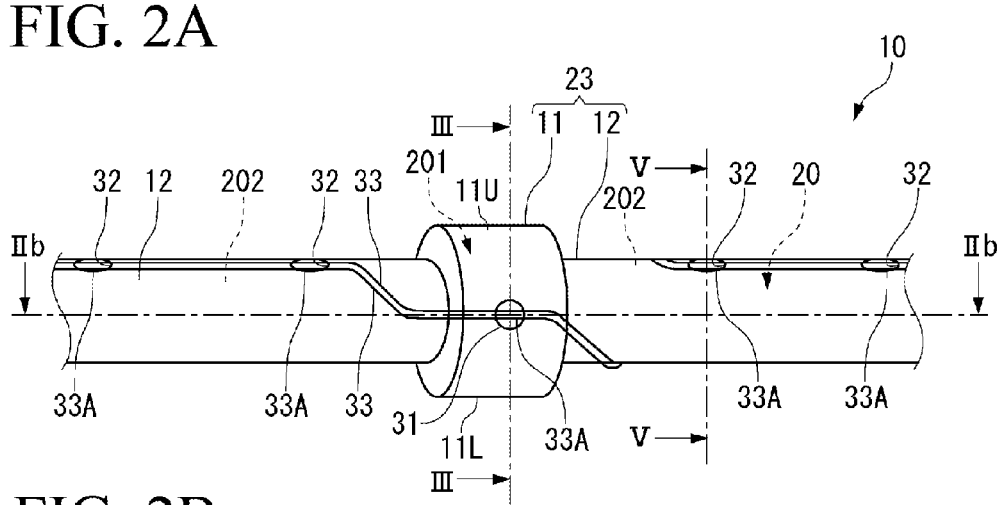
FIG. 2A is a view illustrating a portion in FIG. 1.
Figure 2B:
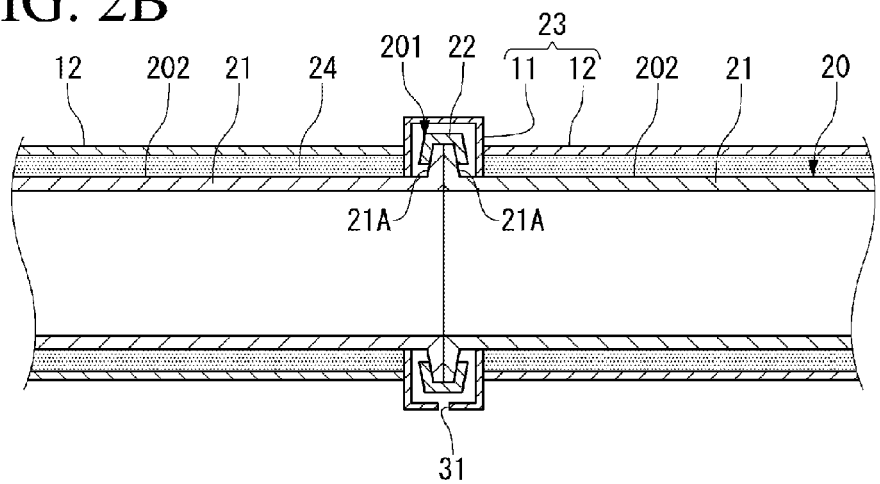
FIG. 2B is an arrow view (a longitudinal-sectional view) taken along a line IIb-IIb in FIG. 2A.

A pipe structure 10 shown in FIGS. 1 and 2A, 2B supplies bleed air from an engine of an aircraft to an air conditioner, an anti-icing device, or the like.

The pipe structure 10 extends almost along a length direction of a main wing of the aircraft, and is disposed along an approximately horizontal direction in a space prepared within the main wing. The "horizontal direction" corresponds to a horizontal direction of the aircraft in a state in which the aircraft is parked on the ground.

The pipe structure 10 is supported by a structural member constituting the main wing, such as a rib, a spar, and a stringer.

In the present specification, an "upper side" means an upper side in a vertical direction, and a "lower side" means a lower side in the vertical direction.

The pipe structure 10 of a present embodiment is also applied to a structure that supplies bleed air from an auxiliary power unit that is provided at a rear end of a fuselage, to the air conditioner, the anti-icing device, or the like. Also in this case, the pipe structure 10 is disposed along the approximately horizontal direction in a space prepared within an airframe, and is supported by a structural member of the airframe.

As shown in FIGS. 2A and 2B, the pipe structure 10 includes a pipe 20 having a plurality of ducts 21 and a plurality of couplings 22, a cover 23 and a heat insulating material 24 that cover an outer periphery of the pipe 20, and a leak sensor 30 (FIG. 1) that detects a leak of the bleed air from the pipe 20.

The pipe 20 is formed of a metal material such as stainless steel. The pipe 20 is sectioned into a connection portion 201 that is the coupling 22 and an end portion of the duct 21, and a general portion 202 of the duct 21. The general portion 202 means a body portion of the duct 21 excluding the end portion of the duct 21.

The insides of the plurality of ducts 21 are in communication with each other. The high-temperature bleed air extracted from the engine continuously flows through the insides of the ducts 21. An outer periphery of each of the ducts 21 is surrounded by the heat insulating material 24 (FIG. 2B).

As the heat insulating material 24, various materials such as glass wool and urethane foam can be used.

Flanges 21A (FIG. 2B) are formed at opposite ends of each of the ducts 21. The flanges 21A and 21A of the adjacent ducts 21 are abutted against each other.

Each of the couplings 22 clamps the flanges 21A and 21A to connect the ducts 21 together.

The cover 23 includes a plurality of connection portion covers 11 each covering an outer periphery of the connection portion 201, and a plurality of general portion covers 12 each covering outer peripheries of the general portion 202 and the heat insulating material 24.

Each of the connection portion covers 11 is fitted to the connection portion 201 along the abutted flanges 21A and 21A. The heat insulating material 24 may be also disposed inside the connection portion cover 11.

The general portion covers 12 and the connection portion covers 11 retain heat of the pipe 20 to a certain extent, and protect the pipe 20 from an external force. For example, a cover formed of resin fiber fabric can be used as the connection portion covers 11 and the general portion covers 12. When the covers 11 and 12 are formed in a ring shape in section, the covers 11 and 12 are easily fitted to the pipe 20.

In a typical pipe structure, airtightness of ducts is ensured by interposing seal rubber between abutted flanges or between a flange and a coupling, or fastening the flanges by a bolt.

In the pipe structure 10 of the present embodiment, however, measures for ensuring airtightness of the connection portion 201 are not taken due to such reasons as a weight reduction and maintainability of the aircraft. In the pipe structure 10, it is tolerated that a small amount of bleed air leaks out of the pipe structure 10 from between the flanges 21A and 21A.

While a leak with a small flow rate is tolerated at the connection portion 201, it is necessary to detect a leak deviating from the tolerable leak amount due to the coupling 22 being loosened, or the flange 21A or the coupling 22 being damaged.

Also, in the general portion 202, it is necessary to reliably detect occurrence of leaks regardless of the leak amounts.

In order to detect the leak of the high-temperature bleed air from the pipe 20, leak-detecting vent holes 31 and 32 are formed in the general portion covers 12 and the connection portion covers 11, and a sensor section 33 of the leak sensor 30 is disposed in the vicinities of the vent holes 31 and 32 as shown in FIG. 2A. The leak is detected based on electrical resistance of the sensor section 33 that is changed when temperatures of portions 33A facing the vent holes 31 and 32 are increased.

The leak sensor 30 (FIG. 1) detects only the leak deviating from the tolerable leak amount regarding the connection portion 201, and detects general leaks including the leak with a small flow rate regarding the general portion 202. The leak sensor 30 collectively detects the leaks of the connection portion 201 and the general portion 202 based on the electrical resistance of the line-shaped sensor section 33 that passes by the respective vent holes 31 and 32. A set temperature as a leak detection threshold value is given to the leak sensor 30.

The leak sensor 30 (FIG. 1) has the sensor section 33 corresponding to a temperature sensor that is sensitive to a temperature, and a controller 34 that detects the leak to be detected by using the electrical resistance of the sensor section 33.

In order to ensure redundancy, the sensor section 33 is duplicated.

A width (a diameter) of the sensor sections 33 is smaller than a hole diameter of the vent holes 31 and 32, and for example, is several mm.

An element whose electrical characteristics are changed to cause a change in electrical resistance when a temperature of the element is increased can be appropriately used as the sensor sections 33.

The sensor sections 33 are supported at a small interval from an outer peripheral portion of the cover 23 by brackets (not shown) that are disposed at appropriate intervals in a length direction. The brackets are fixed to an airframe structure or accessories installed in the airframe.

The circular first vent hole 31 is formed in each of the connection portion covers 11 (FIGS. 2A, 2B) so as to pass through the cover 11 in a thickness direction.

The first vent hole 31 is formed at one position on a circumference of the connection portion cover 11 (FIGS. 3A, 3B).

The bleed air leaking from any position in a circumferential direction of the connection portion 201 flows out of the connection portion cover 11 from the first vent hole 31.

The circular second vent holes 32 are formed in each of the general portion covers 12 (FIGS. 2A, 2B) so as to pass through the cover 12 in a thickness direction. The diameters of the first vent hole 31 and the second vent holes 32 may be equal to or different from each other. The shapes of the first vent hole 31 and the second vent holes 32 are not limited to the circular shape, and another shape may be employed.

The plurality of second vent holes 32 are formed at predetermined intervals in the length direction. Each of the second vent holes 32 is formed at one position on a circumference at a given position of the general portion cover 12 similarly to the first vent hole 31.

The bleed air leaking from a crack or the like generated at any position in a length direction and at any position in a circumferential direction of the general portion 202 passes through the heat insulating material 24, and flows out of the general portion cover 12 from the second vent hole 32 close to the crack.

The sensor sections 33 of the leak sensor 30 are arranged along the cover 23 so as to pass the vicinities of the respective first vent holes 31, and the vicinities of the respective second vent holes 32.

The pipe structure 10 is provided with first robustness for detecting only the leak deviating from the tolerable leak amount without detecting the leak with the tolerable leak amount even in disturbance regarding the connection portion 201. The first robustness is given by uniformly setting a position of the first vent hole 31 corresponding to the connection portion 201 one by one to a lower portion 11L obtained by sectioning the connection portion cover 11 into an upper portion 11U and the lower portion 11L. The lower portion 11L corresponds to a region from a three o'clock position to a nine o'clock position through a six o'clock position in a cross sectional surface of the connection portion cover 11. The upper portion 11U corresponds to a region other than the lower portion 11L. The position of the first vent hole 31 means a direction of the first vent hole 31, that is, an angle (rotation) formed between a hole axis of the first vent hole 31 and a reference position of the cover 23 (for example, A in FIG. 4B). In the present specification, the angle corresponds to "time" by assuming a cross sectional surface of the cover 23 to be a face of a clock. The same applies to positions of the second vent holes 32. FIGS. 1 to 3A,3B show the first vent hole 31 defined at the three o'clock position in the cross sectional surface of the connection portion cover 11 as one example of the first vent hole 31 that is positioned in the lower portion 11L.

The pipe structure 10 is further provided with second robustness for reliably detecting the occurrence of the leak in disturbance regarding the general portion 202. The second robustness is given by uniformly setting the positions of the second vent holes 32 corresponding to the general portion 202 to a twelve o'clock position or its vicinity in a cross sectional surface of the general portion cover 12.

Disturbance factors include movement of an atmosphere (a gaseous body) around the sensor sections 33, fluctuations in temperature/pressure of the gaseous body, and a variation in distance between the sensor sections 33 and the vent holes 31 and 32 due to vibration or an attitude of the aircraft. In the pipe structure 10 that is given the robustness against the disturbance as described above, the targeted leak is properly detected in each of the connection portion 201 and the general portion 202.

Next, an effect obtained by the pipe structure 10 of the present embodiment will be described.

In the following, a flow of the bleed air flowing out from the first vent hole 31 or the second vent hole 32 is referred to as a leak flow, and a flow rate of the leak flow is referred to as a leak flow rate.

Since the leak flow has a higher temperature than the temperature of the gaseous body around the pipe structure 10, buoyancy acts on the leak flow based on a density difference between the leak flow and the surrounding gaseous body. As the flow rate of the leak flow is smaller, the buoyancy more largely affects the leak flow. The first robustness and the second robustness are achieved by using the above fact.

First, the first robustness regarding the connection portion 201 will be described.

FIG. 3A corresponds to a case in which the leak flow from the first vent hole 31 has a small flow rate, and FIG. 3B corresponds to a case in which the leak flow from the first vent hole 31 has a large flow rate.

As described above, the first vent hole 31 corresponding to the connection portion 201 is positioned in the lower portion 11L of the connection portion cover 11. The sensor sections 33 are disposed in the vicinity of the first vent hole 31, and at a position slightly apart from an outer peripheral portion of the connection portion cover 11.

In a case in which the leak flow has a small flow rate, the leak flow flowing out in a hole axis direction from the first vent hole 31 is affected by the buoyancy, and rises along the outer peripheral portion of the connection portion cover 11 with respect to the surrounding gaseous body as indicated by a dashed arrow F1 in FIG. 3A. The leak flow causes the surrounding gaseous body to flow toward the leak flow as indicated by a dashed arrow F2.

As described above, the leak flow rises by deviating from the sensor sections 33, and the surrounding gaseous body moves around the sensor sections 33 in association with the leak flow. Thus, even when the leak flow having a high temperature Th flows out, an increase in a gaseous body temperature Tc around the sensor sections 33 is suppressed. The temperature Th corresponds to the temperature of the leak flow when the leak flow flows out from the first vent hole 31.

On the other hand, in a case in which the leak flow has a large flow rate, the leak flow flowing out from the first vent hole 31 overcomes the buoyancy, and reaches the sensor sections 33 as indicated by a solid arrow F3 in FIG. 3B. Accordingly, a temperature of the sensor sections 33 is increased by the high-temperature leak flow.

When the temperature is increased, the electrical resistance of the sensor sections 33 is changed. The controller 34 (FIG. 1) of the leak sensor 30 determines whether the temperature of the sensor sections 33 reaches a set temperature based on the electrical resistance of the sensor sections 33. When determining that the temperature reaches the set temperature, the controller 34 detects the leak.

Here, when the positions (the angles, the rotation) of the first vent holes 31 in the connection portion covers 11 each covering the connection portion 201 are unified in the lower portion 11L, the leak flows flowing out from all of the first vent holes 31 are equally affected by the buoyancy when the leak flows have the same flow rate. The temperatures of the respective portions 33A of the sensor sections 33 also become equal to each other. For example, a relationship between the leak flow rate and the sensor section temperature in each of the first vent holes 31 is indicated by a thick solid line 101 in a graph of FIG. 4A.

A region A in which the sensor section temperature is as low as the surrounding gaseous body temperature Tc on the thick solid line 101 indicates a range of the leak flow rate that is dominantly affected by the buoyancy.

On the other hand, a region B in which the sensor section temperature is as high as the leak flow temperature Th on the thick solid line 101 indicates a range of the leak flow rate that escapes from the influence of the buoyancy.

Regarding the connection portion 201, the sensor section temperature is clearly separated into the region B on the leak flow temperature Th-side, and the region A on the gaseous body temperature Tc-side outside the connection portion cover 11 and having a lower temperature than the region B according to the leak flow rate as the leak flow has different directions (F1, F3) as described above.

Figure 4A:
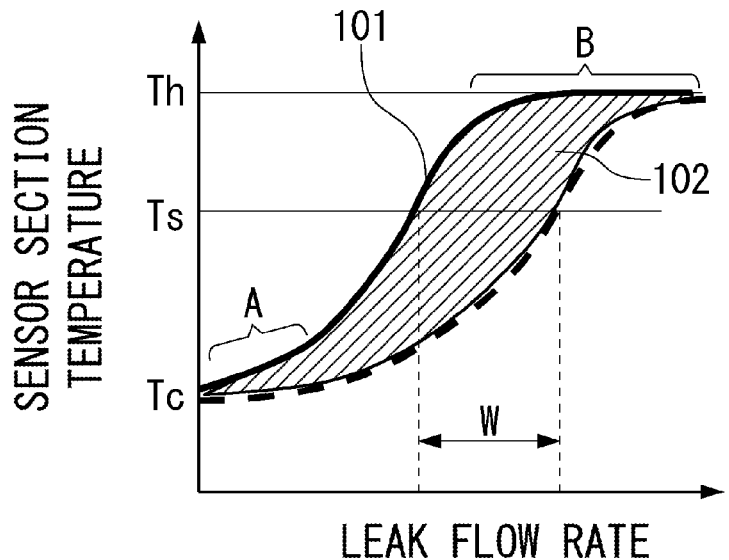
FIG. 4A is a graph illustrating a relationship between a leak flow rate and a sensor section temperature.

If the respective positions (the angles, the rotation) of the first vent holes 31 are not unified, the relationship between the leak flow rate and the sensor section temperature varies depending on the angle as indicated, for example, by a region 102 with diagonal lines in FIG. 4A.

When the relationship between the leak flow rate and the sensor section temperature has a large variation, that is, when the leak flow rate has a large width W with respect to a certain sensor section temperature, it is difficult to give an appropriate set temperature to the leak sensor 30 corresponding to the tolerable leak flow rate. In the present embodiment, the width W is decreased. Thus, a temperature between the gaseous body temperature Tc outside the connection portion cover 11 corresponding to the region A and the leak flow temperature Th corresponding to the region B can be easily set as a set temperature Ts of the leak sensor 30.

Based on the set temperature Ts, it is possible to detect only the leak deviating from the tolerable flow rate without erroneously detecting the leak with the tolerable flow rate.

The present embodiment contributes to smooth operation of the aircraft by preventing the erroneous detection of the leak with the tolerable flow rate, and also contributes to safety of the aircraft by reliably detecting the leak deviating from the tolerable flow rate regarding the connection portion 201.

It is possible to enlarge a range of the lower portion 11L where the first vent hole 31 is positioned.

Figure 4B:
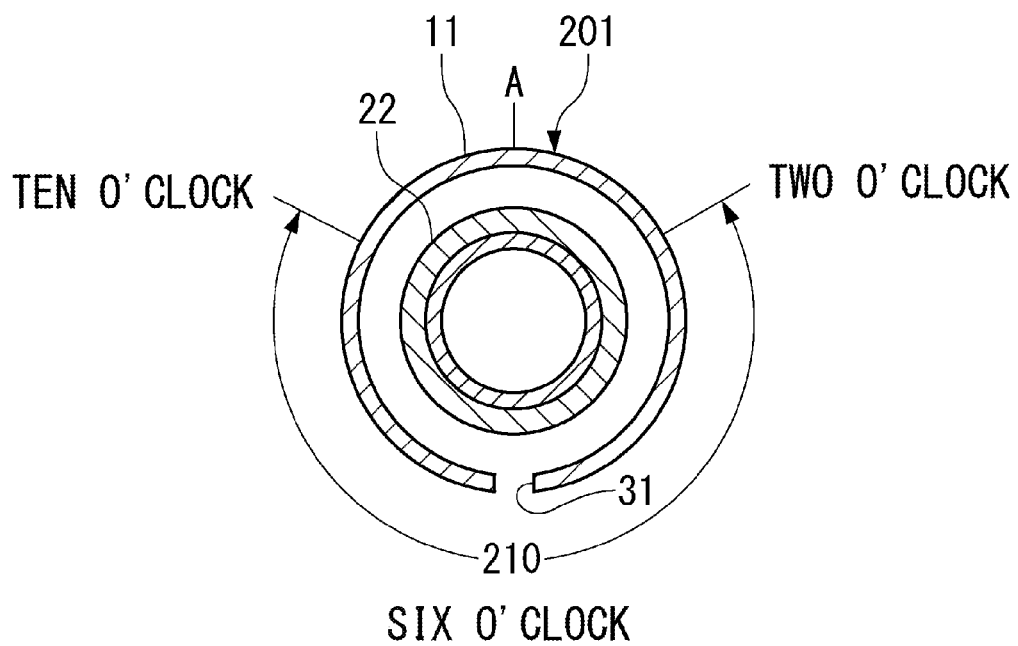
FIG. 4B is a view illustrating a range of a position (an angle, rotation) allowed for a vent hole of the first embodiment.

When the first vent hole 31 is positioned in a hole position range 210 from a two o'clock position to a ten o'clock position through the six o'clock position as shown in FIG. 4B, at least a portion of the leak flow rises by deviating from the sensor sections 33, and the movement of the gaseous body around the sensor sections 33 outside the connection portion cover 11 is also generated in a case in which the flow rate is small. Since the increase in the gaseous body temperature Tc around the sensor sections 33 is thereby suppressed, the hole position range 210 is allowed as the position of the first vent hole 31.

When the first vent hole 31 is positioned at the three o'clock position or the nine o'clock position, the sensor sections 33 are easily mounted to a spar, a stringer, etc. existing on a lateral side of a pipe installation space. The sensor sections 33 can be mounted to a spar, a stringer, etc. extending along a wiring direction by using a bracket (not shown).

Next, the second robustness regarding the general portion 202 will be described.

As described above, each of the second vent holes 32 (FIG. 2A) formed in the general portion cover 12 that covers the general portion 202 is positioned at the twelve o'clock position of the general portion cover 12 or in its vicinity (an upper portion of the general portion cover 12).

Figure 5:
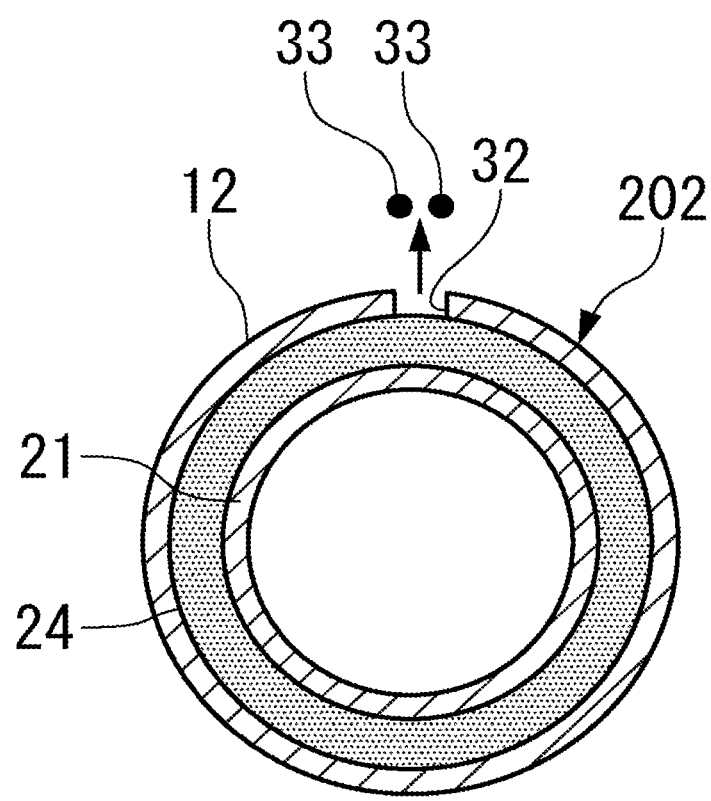
FIG. 5 is an arrow view (a cross-sectional view) taken along a line V-V in FIG. 2A.

Accordingly, not only when the leak flow indicated by an arrow in FIG. 5 has a large flow rate, but also when the leak flow has a small flow rate, the leak flow rises and reaches the sensor sections 33. Since the leak flow having a small flow rate is guided upward by the buoyancy, the leak flow reaches the sensor sections 33 even when the second vent hole 32 is apart from the sensor sections 33 to some extent. When the temperature of the sensor sections 33 is thereby increased, the controller 34 (FIG. 1) of the leak sensor 30 determines whether the temperature of the sensor sections 33 reaches a set temperature based on the electrical resistance of the sensor sections 33. When determining that the temperature reaches the set temperature, the controller 34 detects the leak.

When the respective positions of the second vent holes 32 corresponding to the general portion 202 are unified in the upper portion of the general portion cover 12, the leak flows flowing out from any of the second vent holes 32 reach the portions 33A of the sensor sections 33 facing the second vent holes 32 regardless of the flow rate.

Accordingly, it is possible to reliably detect the occurrence of the leak regardless of the leak flow rate based on the set temperature Ts in each of the second vent holes 32 and, regarding the connection portion 201, it is possible to detect only the leak deviating from the tolerable flow rate as described above.

In the present embodiment, even when the relationship between the flow rate of the leak to be detected and the sensor section temperature slightly varies, the degree of the variation is smaller than that of a case in which the respective positions of the first vent holes 31 and the respective positions of the second vent holes 32 are not unified. Thus, the variation can be dealt with by an adjustment work in which detection sensitivity of the sensor sections 33 is made uniform at the respective positions corresponding to the vent holes. For example, it is possible to perform an adjustment work in which the hole diameter of each vent hole is selected from several stages such that a jet flow from the first vent hole 31 and the second vent hole 32 reaches an appropriate position. It is also possible to perform an adjustment work in which the positions of the first vent hole 31 and the second vent hole 32 in a circumferential direction of the cover 23 are changed within an allowable range, or the distance between the sensor sections 33 and the vent holes 31 and 32 is changed by replacing the bracket for mounting the sensor sections 33.

It is preferable that the positions of all of the first vent holes 31 are uniformly set within the predetermined hole position range 210 (FIG. 4B) as much as possible. However, in some cases, some of the first vent holes 31 need to be formed at positions outside the hole position range 210 due to circumstances such as interference between the bracket for mounting the sensor sections 33 and a member or a device around the pipe 20, and a positional relationship with a device that should avoid contact with the high-temperature leak flow flowing out from the first vent hole 31. Even in this case, as long as the positions of most of the first vent holes 31 are unified in the hole position range 210, the configuration is included in the present invention since the respective positions of the first vent holes 31 are substantially set within the hole position range 210.

The same applies to the second vent holes 32. When the positions of most of the second vent holes 32, if not all, are unified in the twelve o'clock position of the general portion cover 12 or in its vicinity, the configuration is included in the present invention since the respective positions of the second vent holes 32 are substantially set to the twelve o'clock position or its vicinity.

[Modification of First Embodiment]

Figure 6A:
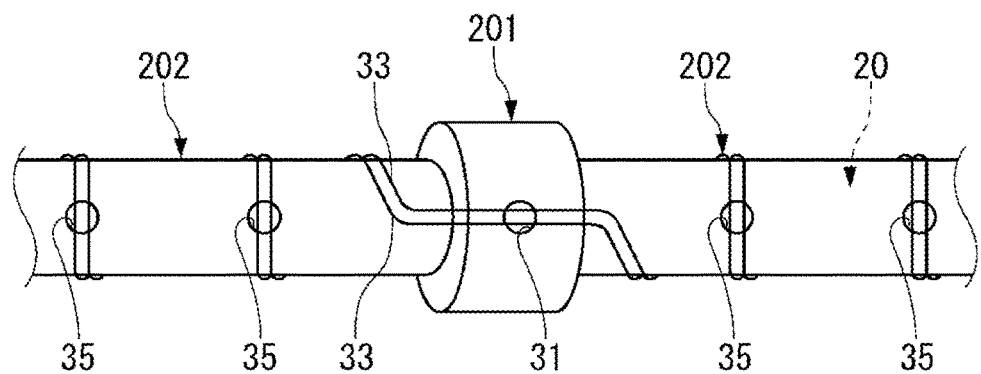
FIGS. 6A and 6B are views illustrating a pipe structure according to a modification of the first embodiment.
Figure 6B:
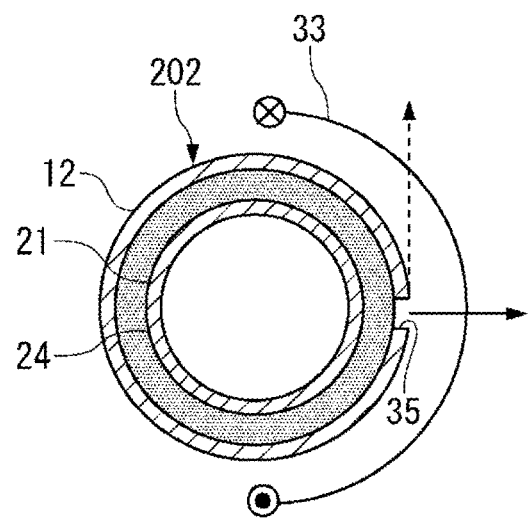

Positions of second vent holes 35 shown in FIGS. 6A and 6B are not unified in the upper portion of the general portion cover 12 unlike the second vent holes 32 of the first embodiment. The sensor sections 33 are erected up along a circumferential direction of the general portion cover 12 at each of the positions of the second vent holes 35. The sensor sections 33 are substantially perpendicular to an axis line of the duct 21 at each of the positions of the second vent holes 35. The second vent holes 35 can be provided at appropriate positions within a range obtained by excluding the six o'clock position and its vicinity from the hole position range 210. FIGS. 6A and 6B show the second vent holes 35 defined at the three o'clock position as one example of the second vent holes 35.

At a position where the second vent holes 35 are arranged in a longitudinal direction of the general portion cover 12, the sensor sections 33 can be disposed in a helical shape around the general portion cover 12.

When the sensor sections 33 are erected up at the positions of the second vent holes 35, the leak flow having a small flow rate rises by the buoyancy as indicated by a dashed arrow in FIG. 6B, to increase the temperature of the sensor sections 33.

The leak flow having a large flow rate overcomes the buoyancy, and directly travels in a hole axis direction of the second vent hole 35 as indicated by a solid arrow in FIG. 6B, to increase the temperature of the sensor sections 33.

That is, the leak flow having a small flow rate can be also certainly captured by the sensor sections 33 similarly to the first embodiment in which the positions of the second vent holes 32 are unified in the upper portion. Thus, it is possible to reliably detect the occurrence of the leak regardless of the flow rate.

[Second Embodiment]

Next, a second embodiment of the present invention will be described by reference to FIG. 7.

In the following, points different from those of the first embodiment will be mainly described. The same constituent elements as those of the first embodiment are assigned the same reference numerals.

In a pipe structure 40 of the second embodiment, a small amount of leak is tolerated in both of the connection portion 201 and the general portion 202 of the pipe 20.

The first vent holes 31 are formed in both of the connection portion cover 11 and the general portion cover 12 so as to pass through the covers in the thickness direction.

The first vent hole 31 is formed in the connection portion cover 11 one by one.

The plurality of first vent holes 31 are formed in the general portion cover 12 at predetermined intervals.

All of the plurality of first vent holes 31 formed in the general portion cover 12 and the connection portion cover 11 are positioned within the hole position range 210 (FIG. 4B) from the two o'clock position to the ten o'clock position through the six o'clock position.

Figure 7:
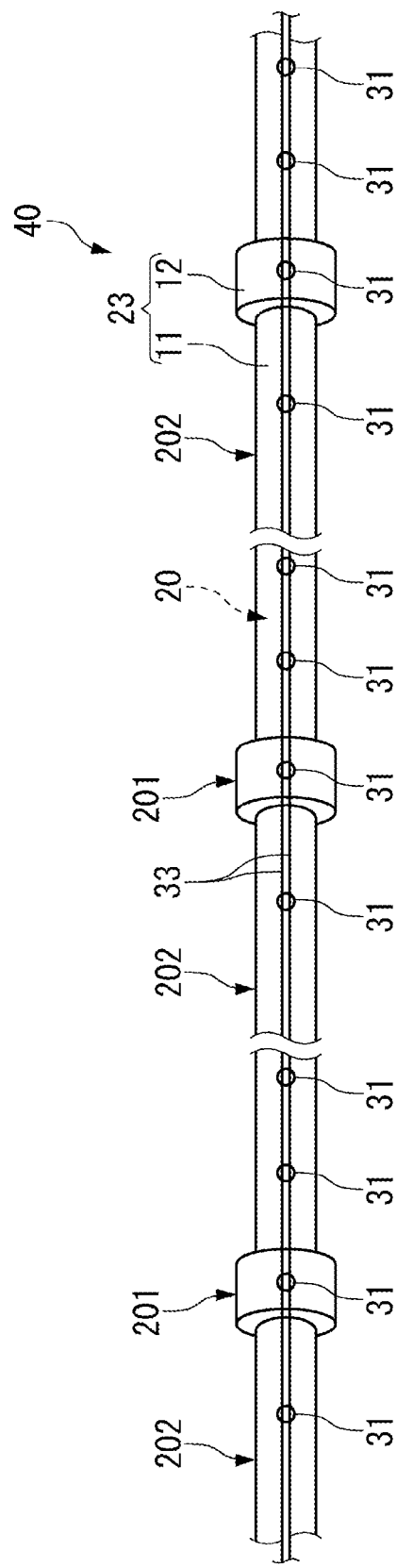
FIG. 7 is a view illustrating a pipe structure according to a second embodiment.

FIG. 7 show the first vent holes 31 defined at the three o'clock position in the cross sectional surface of the cover 23 as one example of the first vent holes 31 positioned within the hole position range 210.

The sensor sections 33 extend along a longitudinal direction of the cover 23 so as to sequentially pass by the first vent holes 31.

The same effect as that of the first embodiment is obtained by unifying the positions of the first vent holes 31 on a lower side. The effect will be simply described.

When the leak of the bleed air occurs in the general portion 202 or the connection portion 201, the leak flow flowing out along the hole axis direction from the first vent hole 31 rises by deviating from the sensor sections 33, and the gaseous body around the sensor sections 33 moves in association with the leak flow as shown in FIG. 3A in a case in which the leak flow has a small flow rate. Therefore, the temperature of the sensor sections 33 is maintained equal to the surrounding gaseous body temperature Tc.

On the other hand, in a case in which the leak flow exceeds a certain leak flow rate and escapes from the influence of the buoyancy, the leak flow reaches the sensor sections 33 facing the first vent hole 31 as shown in FIG. 3B. Therefore, the temperature of the sensor sections 33 is increased to a temperature equal to the leak flow temperature Th.

The sensor section temperature is controlled to the gaseous body temperature Tc-side and the leak flow temperature Th-side according to the leak flow rate (see FIG. 4A) as the leak flow has different directions (F1, F3) as shown in FIGS. 3A and 3B.

Consequently, based on the set temperature Ts set between the gaseous body temperature Tc and the leak flow temperature Th, the robustness for reliably detecting the leak when the flow rate is increased while tolerating the leak with a small flow rate can be provided.

In a case in which the leak flow rate tolerated in the general portion 202 and the leak flow rate tolerated in the connection portion 201 are different, the first vent holes 31 are set to different hole diameters in the general portion cover 12 and the connection portion cover 11. Accordingly, it is possible to detect the leak with a desirable flow rate in each of the general portion 202 and the connection portion 201.

[Third Embodiment]

Next, a third embodiment of the present invention will be described by reference to FIGS. 8A to 9D.

The pipe structures in the third embodiment and a subsequent fourth embodiment are provided with a configuration for further improving the first robustness regarding the detection of only the leak deviating from the tolerable leak amount.

Figure 8A:
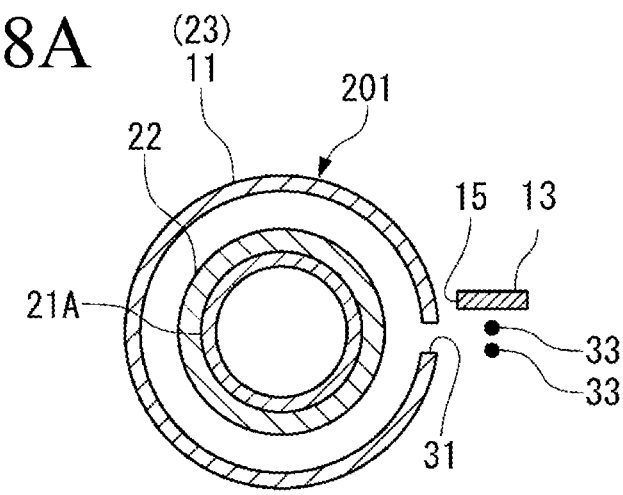
FIG. 8A is a cross-sectional view of a duct connection portion according to a third embodiment.
Figure 8B:
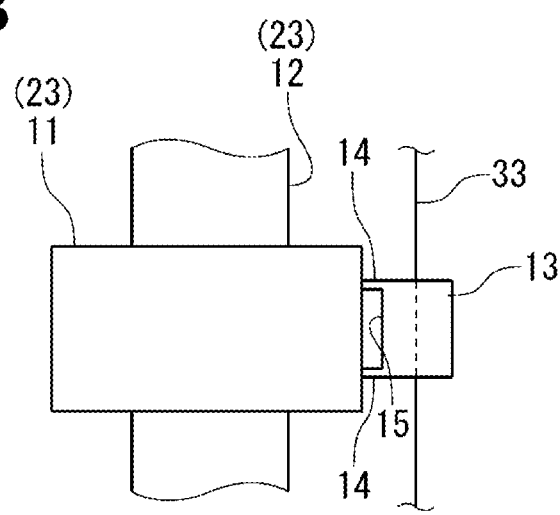
FIG. 8B is an upper view of the duct connection portion.
Figure 8C:
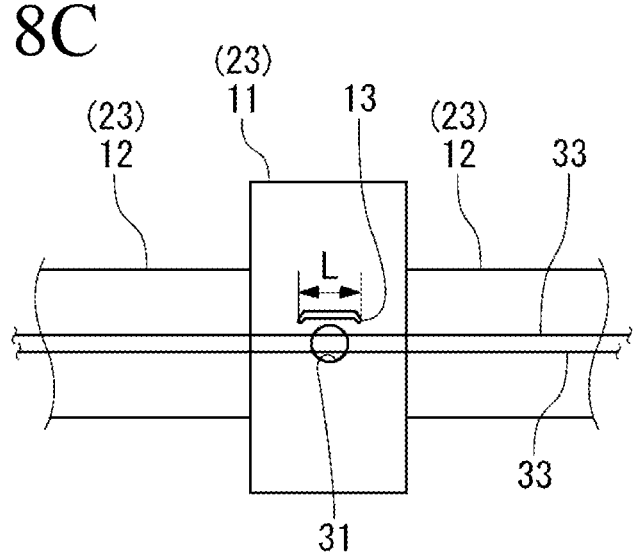
FIG. 8C is a side view of the duct connection portion.

The pipe structure of the third embodiment includes a roof 13 in the vicinity of the first vent hole 31 as shown in FIGS. 8A to 8C. The roof 13 can be disposed in the vicinity of the first vent hole 31 that is positioned within a range obtained by excluding the six o'clock position and its vicinity from the hole position range 210 (FIG. 4B). The roof 13 can be applied to both of the first vent hole 31 described in the first embodiment and the first vent hole 31 described in the second embodiment.

The roof 13 formed in a plate shape is disposed horizontally above the first vent hole 31 at an interval from the cover 23 that defines the first vent hole 31. The roof 13 restricts a rise of a gaseous body, and retains the gaseous body on a lower side of the roof 13. The sensor sections 33 are disposed below the roof 13.

The roof 13 has a pair of support portions 14 (FIG. 8B) that extend from end edge portions of the roof 13 positioned on the cover 23-side to the outer peripheral portion of the cover 23, and is supported on the cover 23 by the support portions 14. The support portions 14 are mounted to the outer peripheral portion of the cover 23.

A space between the roof 13 and the cover 23 is defined by the support portions 14, so that a rectangular opening 15 (FIG. 8B) is formed.

The support portions 14 may be formed integrally with or separately from the roof 13. In the present embodiment, the roof 13 and the support portions 14 are integrally formed by forming a cutout (the opening 15) in a plate.

An effect obtained by the roof 13 will be described.

Figure 9A:
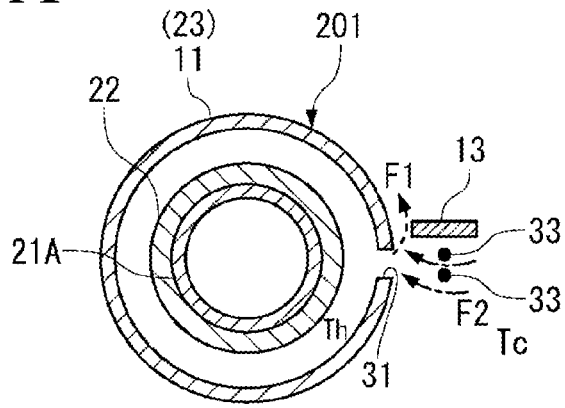
FIG. 9A is a view illustrating a leak with a tolerable small flow rate.
Figure 9B:
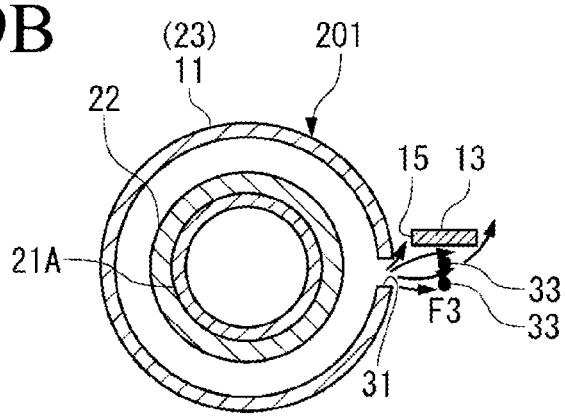
FIG. 9B is a view illustrating a leak with a large flow rate deviating from the tolerable leak amount.
Figure 9C:
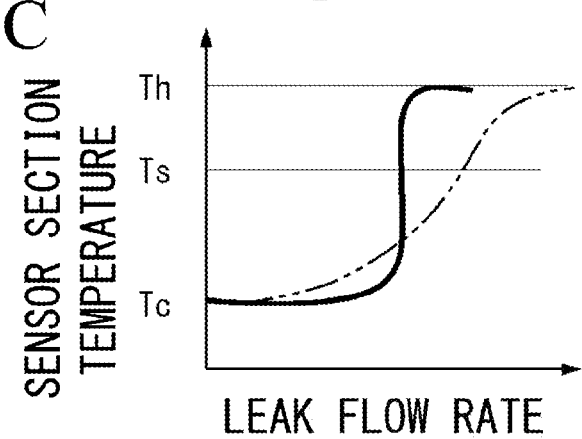
FIG. 9C is a graph illustrating a relationship between a leak flow rate and a sensor section temperature.

FIG. 9A corresponds to a case in which the leak flow from the first vent hole 31 has a small flow rate, and FIG. 9B corresponds to a case in which the leak flow from the first vent hole 31 has a large flow rate.

In a case in which the leak flow has a small flow rate, the leak flow flowing out in the hole axis direction from the first vent hole 31 is affected by the buoyancy as indicated by a dashed arrow F1 in FIG. 9A. Since the leak flow rises through the opening 15 (FIG. 8B) between the roof 13 and the cover 23, the leak flow does not reach the sensor sections 33. Moreover, the gaseous body below the roof 13 is sucked out toward the leak flow from the opening 15 as indicated by a dashed arrow F2 accompanying the leak flow. Since the leak flow does not reach the sensor sections 33, and the gaseous body around the sensor sections 33 moves as described above, a temperature around the sensor sections 33 is maintained.

On the other hand, when the leak flow exceeds a certain leak flow rate, the leak flow flowing out from the first vent hole 31 overcomes the buoyancy, and is blown to the lower side of the roof 13 without passing through the opening 15 as indicated by a solid arrow F3 in FIG. 9B. Since the rise of the blown leak flow is restricted by the roof 13, the sensor sections 33 are surrounded by the high-temperature air. Accordingly, the temperature of the sensor sections 33 is rapidly increased. In order to sufficiently retain the high-temperature air around the sensor sections 33, a dimension L of the roof 13 (FIG. 8C) may be set to be larger than the hole diameter of the first vent hole 31.

As described above, when the leak flow has a small flow rate, the low-temperature gaseous body flows around the sensor sections 33. When the leak flow has a large flow rate, the high-temperature leak flow is concentrated around the sensor sections 33. When a flow state is rapidly switched as described above, sharp flow rate-temperature characteristics in which the sensor section temperature rises from a certain flow rate can be obtained as indicated by a solid line in FIG. 9C. An alternate long and two short dashes line indicates an example of flow rate-temperature characteristics in the first embodiment.

When the sensor section temperature is almost binarized by the sharp flow rate-temperature characteristics, it is possible to certainly detect only the leak with a deviating flow rate based on the set temperature Ts even in large disturbance.

A form of the support portions 14 is not particularly limited, and any form can be employed as long as the support portions 14 link the roof 13 and the cover 23 without closing the space between the roof 13 and the cover 23 through which the leak flow passes by the buoyancy.

Figure 9D:
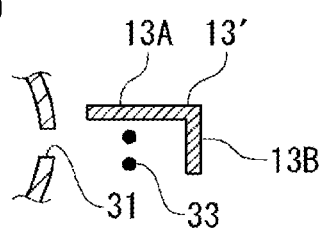
FIG. 9D is a view illustrating a modification of a roof of the third embodiment.

A roof 13' shown in FIG. 9D can be preferably employed instead of the roof 13.

The roof 13' has a horizontal portion 13A corresponding to the above roof 13, and a suspended portion 13B that extends downward from a distal end of the horizontal portion 13A. The leak flow blown to a lower side of the horizontal portion 13A stays on the lower side by the suspended portion 13B, and the temperature increase of the sensor sections 33 is promoted. Thus, sharper flow rate-temperature characteristics can be obtained. Consequently, the robustness can be further improved.

[Fourth Embodiment]

Next, a fourth embodiment of the present invention will be described by reference to FIGS. 10A-10C.

In the fourth embodiment, the roof 13 is supported by the sensor sections 33. The fourth embodiment is similar to the third embodiment in the basic configuration and the effect excluding the above point.

Figure 10A:
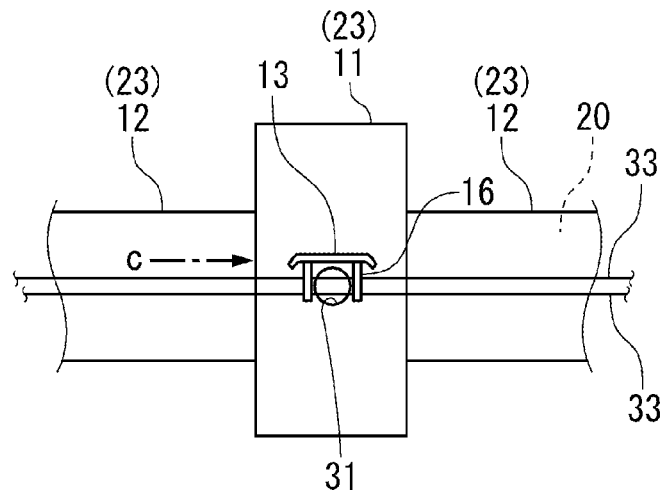
FIG. 10A is a side view of a duct connection portion according to a fourth embodiment.
Figure 10B:
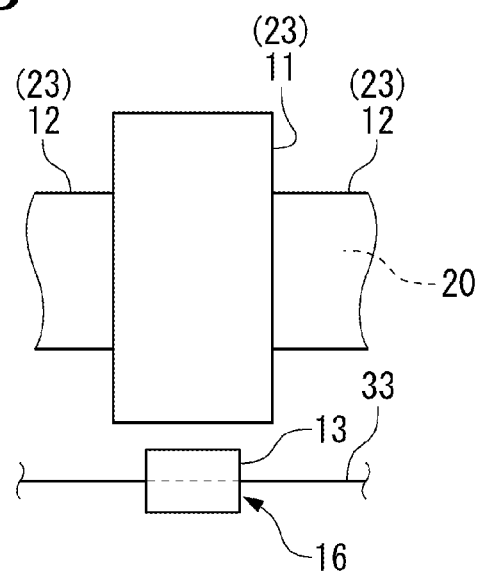
FIG. 10B is an upper view of the duct connection portion.

As shown in FIG. 10A, the roof 13 is integrated with a clip 16 that holds the sensor sections 33.

The clip 16 has the rectangular roof 13 (FIG. 10B) that is disposed at an interval from the cover 23, and a holding portion 17 that supports the roof 13 from below. The holding portion 17 is provided at each of opposite ends of the roof 13 in the length direction of the pipe 20.

Figure 10C:
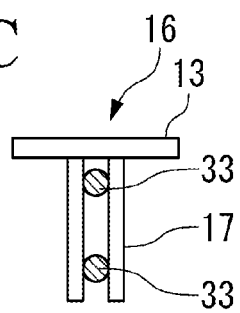
FIG. 10C is a view illustrating a leak flow guiding member from a direction c in FIG. 10A.

The holding portion 17 pinches and holds both of the duplicated sensor sections 33 and 33 as shown in FIG. 10C. The holding portion 17 can be attached to and detached from the sensor sections 33.

The roof 13 is supported on the sensor sections 33 via the clip 16. The roof 13 and the sensor sections 33 may be integrally formed.

In accordance with the present embodiment, the roof 13 can be easily supported on the sensor sections 33 only by fitting the clip 16 to the sensor sections 33. It is also easy to change the clip 16 to a clip having the roof 13 with a different size in order to adjust the sensitivity of the sensor sections 33.

When the sensor sections 33 have higher rigidity than the cover 23, it is preferable to mount the roof 13 to the sensor sections 33 as in the present embodiment in order to stably support the roof 13.

[Fifth Embodiment]

Figure 11A:
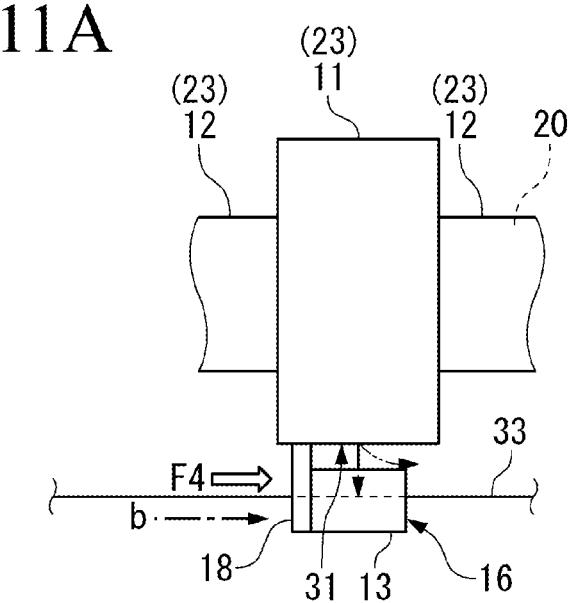
FIG. 11A is a side view of a duct connection portion according to a fifth embodiment.
Figure 11B:
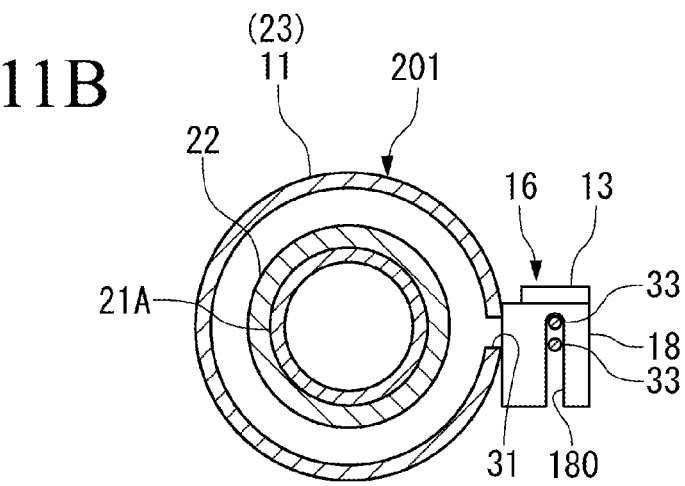
FIG. 11B is a view illustrating a wind protection wall from a direction b in FIG. 11A.

Next, a fifth embodiment of the present invention will be described by reference to FIGS. 11A-11C.

The pipe structure according to the fifth embodiment includes a wind protection wall 18 in order to avoid a decrease in the robustness due to wind F4 around the pipe structure.

For example, the wind F4 is generated by ventilation of the pipe installation space, or movement of a gaseous body due to a temperature gradient or a pressure gradient in the space. The wind F4 flows in a direction crossing the hole axis direction of the first vent hole 31 that defines an original direction of the leak flow.

The wind protection wall 18 extends at least to the sensor sections 33 from a surface of the cover 23 where the first vent hole 31 is positioned, and blocks the wind F4 to suppress flowing of the leak flow according to the direction of the wind F4.

The wind protection wall 18 is disposed in contact with or close to the surface of the cover 23. A cutout 180 through which the sensor sections 33 are passed is formed in the wind protection wall 18 (FIG. 11B). The wind protection wall 18 extends to a position below the first vent hole 31.

The wind protection wall 18 of the present embodiment is integrated with the clip 16 (FIGS. 10A-10C) and the roof 13 of the fourth embodiment. When the clip 16 is fitted to the sensor sections 33, the sensor sections 33 are disposed inside the cutout 180 directed in the same direction as the holding portion 17.

Note that the wind protection wall 18 may not be integrated with the clip 16 and the roof 13. The wind protection wall 18 may be provided in the cover 23 or the sensor sections 33 by itself.

When the wind F4 is blocked by the wind protection wall 18, the leak flow flowing out from the first vent hole 31 stably rises even when the leak flow has a small flow rate. Accordingly, the direction of the leak flow is switched at a certain flow rate, and the temperature of the sensor sections 33 is also switched at around the flow rate. Consequently, the robustness can be secured.

The wind protection wall 18 can be also applied to the second vent hole 32 corresponding to the general portion 202 in which even a small amount of leak is not tolerated. Even in this case, the leak flow having a small flow rate stably rises to the sensor sections 33 by blocking the wind F4. Accordingly, it is possible to reliably detect the occurrence of the leak.

The wind protection wall 18 may include two or more wall surfaces.

Figure 11C:
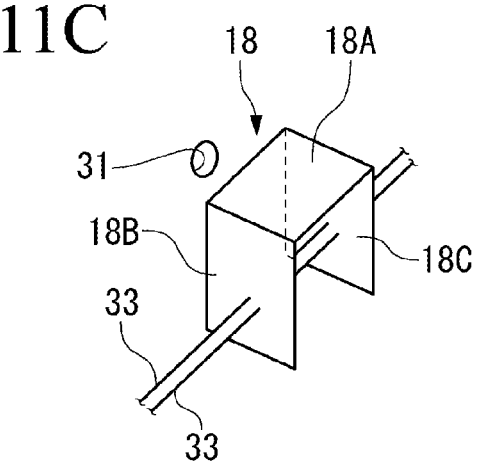
FIG. 11C shows another wind protection wall.

For example, when the wind protection wall 18 includes an upper surface 18A and two side surfaces 18B and 18C as shown in FIG. 11C, winds flowing from three directions can be blocked by the wall surfaces. The upper surface 18A of the wind protection wall 18 also functions as the roof 13. Since the leak flow blown to a lower side of the upper surface 18A from the first vent hole 31 is retained within the wind protection wall 18 by the side surfaces 18B and 18C, the sensor sections 33 are more sufficiently surrounded by the high-temperature air. Thus, the leak detection sensitivity is improved.

In addition to the configurations of the embodiments described above, the configurations may be also freely selected or appropriately changed into other configurations without departing from the gist of the present invention.

The pipe structure of the present invention is not limited to the structure through which the bleed air from the engine or the auxiliary power unit flows. The present invention can be also applied to a pipe structure through which another high-temperature gas flows.

Also, the present invention is not limited to the aircraft, and can be applied to a pipe structure provided in various industrial plants.

Furthermore, the sensitive section used for the leak detection is not limited to the temperature sensor that is sensitive to a temperature of a gaseous body in a space to which the gaseous body leaks, and a concentration senor that is sensitive to a concentration of a gaseous body may be also employed.

What is claimed is:

1. A pipe structure comprising:
    a pipe that is disposed along an approximately horizontal direction, and has a plurality of ducts through which a gaseous body having a higher temperature than a temperature of a surrounding atmosphere continuously flows, and a plurality of couplings each connecting the ducts together; and
    a cover that covers an outer periphery of the pipe,
    wherein the cover defines a plurality of vents from which the gaseous body leaking from the pipe flows out of the cover at an interval in a length direction of the pipe, and
    as the plurality of vents, the cover comprises first vents that are located corresponding to the plurality of couplings, and second vents that are located corresponding to the plurality of ducts,
    wherein respective positions of the first vents are substantially set within a range from a two o'clock position to a ten o'clock position through a six o'clock position in a cross sectional surface of the cover, and wherein respective positions of the second vents are substantially set to a twelve o'clock position in the cross sectional surface of the cover.

2. The pipe structure according to claim 1,
    further comprising a leak sensor that detects a leak of the gaseous body,
    wherein the leak sensor has
    a sensitive section that passes a position corresponding to each of the plurality of vents and is sensitive to a temperature or a concentration of a gaseous body outside the cover, and
    a detection section that detects the leak by using a state of the sensitive section.

3. The pipe structure according to claim 2,
    wherein
    the leak sensor is disposed so as to be erected up along a circumferential direction of the cover at positions corresponding to the second vents.

4. The pipe structure according to claim 2,
    further comprising a roof that is located in a vicinity of at least one of the first vents,
    the roof is configured to restrict a rise of a gaseous body wherein the roof is disposed above the at least one first vent at an interval from the cover that defines the first vents, and
    the sensitive section is disposed below the roof.

5. The pipe structure according to claim 4,
    wherein the roof is supported on the cover by a support portion that links the roof and the cover.

6. The pipe structure according to claim 4,
    wherein the roof is supported on the sensitive section by a clip that holds the sensitive section.

7. The pipe structure according to claim 2, the sensitive section of the leak sensor being sensitive to the temperature of the gaseous body outside the cover, and a set temperature of the sensitive section is set between a first range of temperatures of a leak flow rate that is affected by a buoyancy and a second range of temperatures of the leak flow rate that escapes from the influence of the buoyancy.

8. The pipe structure according to claim 1,
    further comprising a wind protection wall that is located in a vicinity of at least one of the first vents,
    the wind protection wall is configured to block a flow of a gaseous body outside the cover that affects a flow of the gaseous body flowing out from the at least one first vent.

9. The pipe structure according to claim 1,
    wherein the respective positions of the first vents are substantially set within a range from a three o'clock position to a nine o'clock position through a six o'clock position in the cross sectional surface of the cover.

10. The pipe structure according to claim 1,
    wherein the respective positions of the first vents are substantially set to a three o'clock position or a nine o'clock position in the cross sectional surface of the cover.

11. An aircraft comprising the pipe structure according to claim 1.

12. The aircraft according to claim 11,
    wherein the gaseous body is bleed air from an engine or an auxiliary power unit that is a power source of the aircraft.

13. A method for giving robustness to leak detection, comprising:
    defining a plurality of vents in a cover that covers an outer periphery of a pipe disposed along an approximately horizontal direction at an interval in a length direction of the pipe, wherein the pipe comprises a plurality of ducts and a plurality of couples, each coupling connecting the ducts together;
    causing a gaseous body leaking from the pipe and having a higher temperature than a temperature of an atmosphere around the pipe to flow out of the cover from the vents; and
    detecting a leak of the gaseous body by using a temperature or a concentration of the gaseous body at positions corresponding to the vents,
    wherein the plurality of vents comprises first vents and second vents,
    wherein the first vents are located corresponding to the plurality of couplings, wherein respective positions of the first vents are substantially set within a range from a two o'clock position to a ten o'clock position through a six o'clock position in a cross sectional surface of the cover, and
    wherein the second vents are located corresponding to the plurality of ducts, wherein respective positions of the second vents are substantially set to a twelve o'clock position in the cross sectional surface of the cover.

14. The method for giving robustness to leak detection according to claim 13,
    wherein the pipe is mounted on an aircraft, and
    the gaseous body is bleed air from an engine or an auxiliary power unit that is a power source of the aircraft.

* * * * *